May 29, 1923.

G. W. CARLSON

LUBRICATION OF AUTOMOTIVE VEHICLE KNUCKLES

Filed April 4, 1922

1,456,618

INVENTOR.
Gustav W. Carlson
BY Ward Crosby & Smith
his ATTORNEYS.

Patented May 29, 1923.

1,456,618

UNITED STATES PATENT OFFICE.

GUSTAV W. CARLSON, OF CLEVELAND, OHIO, ASSIGNOR TO THE TORBENSEN AXLE COMPANY, OF CLEVELAND, OHIO, A CORPORATION OF OHIO.

LUBRICATION OF AUTOMOTIVE VEHICLE KNUCKLES.

Application filed April 4, 1922. Serial No. 549,592.

*To all whom it may concern:*

Be it known that I, GUSTAV W. CARLSON, a subject of King Gustav V of Sweden (first U. S. citizenship papers taken out in September, 1918), and a resident of Cleveland, in the county of Cuyahoga and State of Ohio, have invented certain new and useful Improvements in Lubrication of Automotive Vehicle Knuckles, of which the following is a specification.

My invention relates to lubrication of automotive vehicle knuckles, such for example as the lubrication of steering knuckles of automobiles.

Maintaining proper lubrication of steering knuckles of automotive vehicles has been found difficult, and the object of this invention is to insure more reliable and efficient lubrication of the bearings of such apparatus. In carrying out my invention according to the preferred embodiment thereof I provide a wick in the hollow knuckle or pivot pin, supported at its upper end by a hollow support, such for example as a hollow spool, from the outside of which the wick is suspended so as to leave a free passage for pouring oil into the reservoir. The spool or support is located at the upper portion of the hollow pin and is so constructed and positioned as to guide the lubricant into one or more transverse openings or ducts leading to the bearings.

My invention consists in the novel construction, arrangement and combination of parts hereinafter described according to the preferred embodiment thereof. The invention will be more particularly pointed out in the appended claims.

In the drawings, wherein like reference characters denote like or corresponding parts:—

Figure 1:
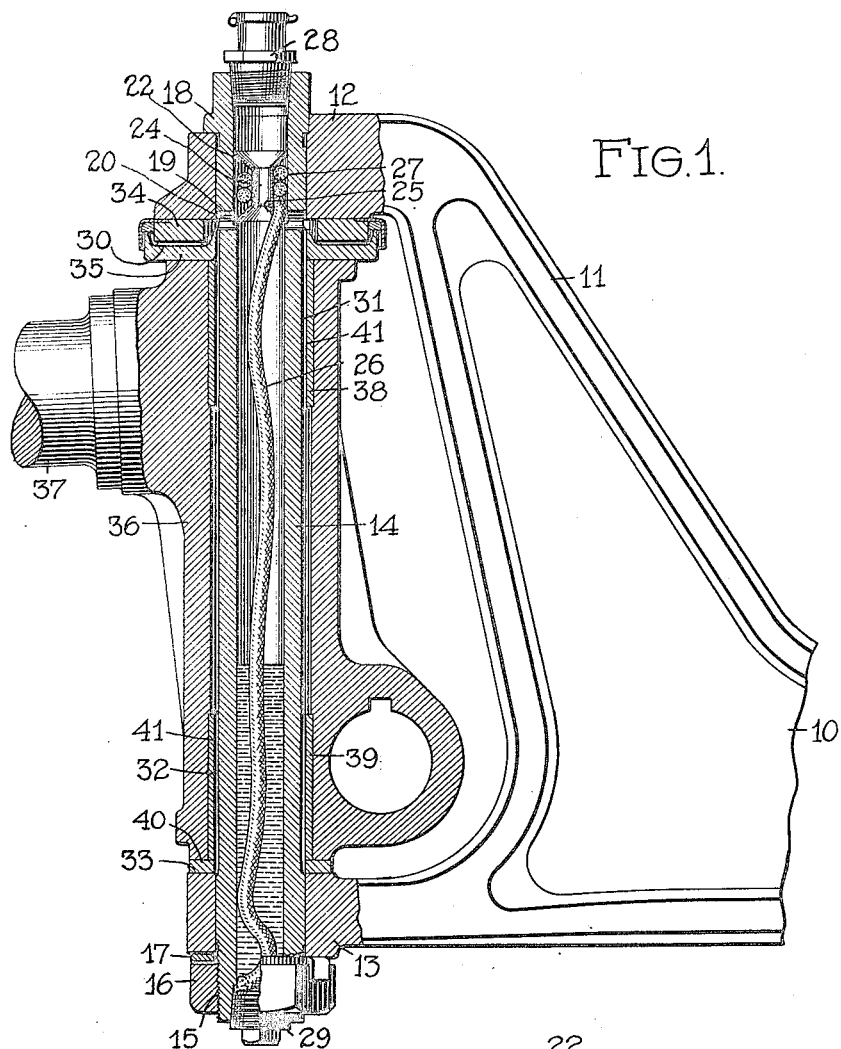
Figure 1 is a vertical section through a steering knuckle embodying my invention.

The front axle of an automobile, in the embodiment of the invention selected for illustration, is designated as 10. It is provided, as usual, with a forked end 11, in turn provided with aligned bearings 12 and 13. A hollow pivot pin 14 is carried by the bearings 12 and 13, the pivot pin at its lower end being externally threaded as at 15 and projected beyond the lower bearing 13. Such threaded end 15 is adapted to receive a nut 16 and lock washer 17 by means of which the pivot pin 14 is held in place. At its opposite end the pivot pin 14 is provided with a shoulder 18 which is adapted to bear against the top surface of the bearing 12.

Figure 2:
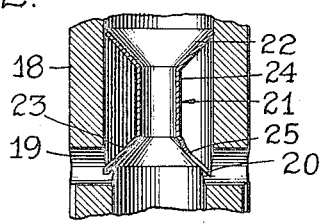
Figure 2 is a detail vertical section through the pivot pin and wick support showing the manner in which the spool is supported; and, Figure 3 is a detail perspective view of the spool or wick support.
Figure 3:
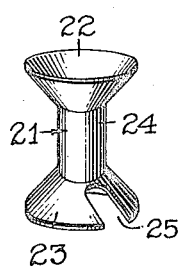

Intermediately of its ends, the hollow pivot pin 14 is provided with one or more transverse openings 19, adjacent to which, and within the hollow of the pin, an annular shoulder 20 is formed. This shoulder is preferably inclined and in and of itself comprises a suitable supporting ledge or rest for the spool or wick support designated in its entirety as 21. Preferably, the wick support is substantially spool shaped (see Figure 2) and hollow, the flared ends thereof being designated respectively as 22 and 23 and the hollow stem as 24. The lower flared end of the spool (23) has formed therein a notch 25 through which the wick, designated as 26, extends. The wick 26 at one end is wound around the hollow stem 24 of the spool and at its opposite end is carried to a point at or near the lower end of a reservoir formed by the hollow pivot pin itself. The hollow pivot pin at its opposite end is interiorly threaded to receive on the one hand a filler plug 28 and on the other hand a drain plug 29. By removing the latter the oil contained in the reservoir may be drained and by removing the former the oil or lubricant supply can be readily replenished.

The active bearing surfaces of the steering knuckle are designated as 30, 31, 32, and 33. Such surfaces, in the operation of the device, are at all times thoroughly lubricated, the lubricant being continuously fed to such surfaces by means of the wick 26 to and through the transverse opening 19. The bearing surface 30 is formed by bushings 34 and 35 carried respectively by the bearing 12 and the hollow head portion 36 of the wheel spindle 37. Through and within the hollow head portion 36 of the spindle, the pivot pin 14 extends. In turning the wheel (not shown) the hollow head portion 36 is adapted to rotate about the pivot pin. The bearing surface 31 is formed by a bushing 38 and the hollow pivot pin and the bearing surface 32 is formed by a bushing 39 and the hollow pivot pin, the bushings 38 and 39 being vertically spaced and in alignment. The bearing surface 33 is formed by the bearing 13 and a bushing 40 carried by the hollow head portion 36 of the spindle. To provide for the passage of oil on the exterior of the hollow pivot pin to the various active bearing surfaces, grooves 41 are formed on the exterior of the pin, such grooves being substantially co-extensive with the vertically aligned bushings.

The oil or lubricant in its passage to the various active bearing surfaces is withdrawn from the reservoir by means of the wick 26 to a point in the vicinity of the transverse opening 19 where it is guided laterally into and through the transverse opening by means of the spool or wick support. From the transverse opening 19, the lubricant enters upon the active bearing surface 30, and through the grooves 41 enters upon the active bearing surface 31. From the bearing 31 the lubricant finds its way to the active bearing 32, and through the grooves 41 finds its way ultimately to the active bearing surface 33, thereby thoroughly lubricating all of the total number of active bearing surfaces at all times.

The arrangement described not only forms a very simple manner of effecting proper lubrication of all active bearing surfaces, but forms in addition a positive system in view of the fact that the wick support or spool tends to direct the lubricant into and through the transverse opening and onto the bearing surfaces. Furthermore, in the particular embodiment of the invention selected for illustration not only may the full length of the hollow pivot pin be utilized for holding the lubricant, but as the wick support 21 is hollow and its ends flared oppositely, the lubricant in entering the reservoir is free to flow through the hollow spool without encountering any obstruction whatsoever.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:—

1. In a knuckle construction, the combination of a hollow knuckle pin, a bearing at the upper portion thereof, a guide for lubricant mounted in the upper portion of the hollow pin and adapted to direct lubricant from the hollow pin into an opening to the bearing, and a wick supplying lubricant to said upper portion of the pin.

2. In a knuckle construction, the combination of a hollow knuckle pin, a bearing at the upper portion thereof, said pin having a transverse opening for supplying lubricant to the bearing, a device in the upper portion of said hollow pin adjacent said opening and having a peripheral portion engaging an inner portion of the pin so as to intercept lubricant from its course down the pin and guide same into said opening.

3. In a knuckle construction, the combination of a hollow knuckle pin, a bearing at the upper portion thereof, said pin having a transverse opening for supplying lubricant to the bearing, a device in the upper portion of said hollow pin adjacent said opening and having a peripheral portion engaging an inner portion of the pin so as to intercept lubricant from its course down the pin and guide same into said opening, and a wick in the hollow pin for feeding lubricant up to the peripheral portion of said device.

4. In a knuckle construction, the combination of a hollow knuckle pin, a bearing at the upper portion thereof, said pin having a transverse opening for supplying lubricant to the bearing, a shoulder formed on the inside of the pivot pin adjacent the opening, a guide for lubricant engaging said shoulder and so related to said opening as to direct lubricant therethrough and onto the bearing surface, and a wick in the hollow pin for feeding lubricant up to said guide.

5. In a knuckle construction, the combination of a hollow knuckle pin, a bearing at the upper portion thereof, said pin having a transverse opening for supplying lubricant to the bearing, a shoulder formed on the inside of the pivot pin adjacent the opening, a guide for lubricant, said guide having a downwardly and vertically flaring peripheral portion engaging said shoulder and adapted to intercept lubricant from its course down the pin and guide same into said opening.

6. In a device of the character described, the combination of a hollow pivot pin provided with a transverse opening, a bearing surface, a source of lubrication, and a guide for the lubricant mounted in the hollow of the pivot pin adjacent to said opening for directing the lubricant through said opening and onto the bearing surface.

7. In a device of the character described, the combination of a source of lubrication, a bearing surface, a hollow pivot pin having a transverse opening formed therein, and means within the hollow pivot pin for feeding and guiding the lubricant toward said opening and onto the bearing surface.

8. In a device of the character described, the combination of a bearing surface, a hollow pivot pin having a transverse opening formed therein, the pin itself constituting an oil reservoir, and means within the reservoir and adjacent to the transverse opening formed therein for guiding the lubricant toward said opening and onto the bearing surface.

9. In a device of the character described, the combination of an upright lubricant reservoir, a bearing surface at the upper portion of same, a wick, and a combined wick support and lubricant guide, also at the upper portion of said reservoir, so related to the bearing surface as to direct the lubricant fed by the wick onto said bearing surface.

10. In a device of the character described, the combination of a bearing surface, a hollow pivot pin provided with a transverse opening, to the bearing, a shoulder formed on the inside of the pivot pin adjacent to said opening, a source of lubrication, a guide for lubricant carried by said shoulder and so related to said opening as to direct the lubricant therethrough and onto the bearing surface, and means for conducting lubricant from the source of lubrication to said guide.

11. In a knuckle construction, the combination of a hollow knuckle pin carrying lubricant at its lower end, a bearing at the upper portion of the pin, said pin having a transverse opening for supplying lubricant to the bearing, a wick in the pin for feeding lubricant up to the opening and a support for the wick in the upper portion of the pin, said support being so constructed as to confine the wick at the support to only a portion of the cross sectional area of the pin chamber, and to provide a free passage for supplying lubricant to the pin through the other portion of said cross sectional area.

12. In a device of the character described, the combination of a bearing surface, a lubricant reservoir, a wick for conducting lubricant up to said bearing surface, and a hollow support for the wick through the hollow of which the lubricant is free to pass in filling said lubricant reservoir.

13. In a device of the character described, the combination of a bearing surface, a hollow pivot pin, a source of lubrication, a wick enclosed in the hollow pivot pin for conducting lubricant up to said bearing surface, and a hollow substantially spool shaped support for the wick through the hollow of which lubricant is free to pass in filling said lubricant reservoir.

14. In a device of the character described, the combination of a hollow pivot pin provided with a transverse opening, a shoulder formed inside the hollow pivot pin adjacent to said opening, a source of lubrication, a wick enclosed in the hollow pivot pin for conducting lubricant from said source of lubrication up to a point in the vicinity of said transverse opening, an active bearing surface, and a combined wick support and lubricant guide carried by said shoulder within the hollow pivot pin for directing the lubricant into and through said opening and onto the bearing surface.

15. In a device of the character described, a bearing surface, a hollow pivot pin providing in and of itself a lubricant reservoir and having a transverse opening to the bearing surface, a drain plug at one end of the hollow pivot pin, a filler plug at the opposite end of the hollow pivot pin, and means inside the hollow pivot pin for conducting the lubricant contained therein up to and directing it into the transverse opening and onto said bearing surface.

Signed at Cleveland, in the county of Cuyahoga and State of Ohio, this 23rd day of March A. D. 1922.

GUSTAV W. CARLSON.